United States Patent [19]

McFee

[11] 4,221,536
[45] Sep. 9, 1980

[54] METHOD OF HANDLING BAGGAGE

[76] Inventor: William R. McFee, 3649 McKinley Ave., Las Vegas, Nev. 89121

[21] Appl. No.: 868,028

[22] Filed: Jan. 9, 1978

[51] Int. Cl.² .................................................. B60P 3/06
[52] U.S. Cl. ............................. 414/786; 104/172 BT; 296/1 A; 414/495; 414/499; 414/501; 414/538
[58] Field of Search ................. 214/85, 85.1, 515–517, 214/512, 518, 16.1 EC; 296/1 A; 105/368 R; 104/172 BT, 172 C; 414/495, 499, 786, 501, 538

[56] References Cited

U.S. PATENT DOCUMENTS

| | | | |
|---|---|---|---|
| 2,659,504 | 11/1953 | Kranawetvogel et al. | 214/516 X |
| 3,418,949 | 12/1968 | Fromme et al. | 104/172 C |
| 3,497,093 | 2/1970 | Mardiat | 214/515 |
| 3,902,613 | 9/1975 | Newland | 214/85.1 |
| 4,084,714 | 4/1978 | Williams | 214/515 |

FOREIGN PATENT DOCUMENTS 2209703   3/1972   Fed. Rep. of Germany ........... 214/512

Primary Examiner—Robert G. Sheridan
Attorney, Agent, or Firm—Seiler & Quirk

[57] ABSTRACT

A system for transporting baggage, or other articles, comprises a trailer having a plurality of cases secured thereon, each case for receiving two baggage containing mobile capsules, having a lift means for elevating and holding one of the capsules above the other capsule within the case, a ramp and conveyor for engaging a capsule at ground level and moving the capsule along the ramp into the case, and drive means associated with the system for the lift means and conveyor.

2 Claims, 3 Drawing Figures

METHOD OF HANDLING BAGGAGE

BACKGROUND OF THE INVENTION

Baggage and luggage handling and transportation has become increasingly important and costly due to increased travel of individuals and groups. In vacation and convention locations, where significant numbers of persons travel in groups, and arrive and leave together, and where a plurality of hotels in a city are used by the group or groups of travelers, efficient baggage handling becomes even more problematic.

In many areas, in order to avoid the multiple handling requirements of taking baggage from a plane, and transferring it to a baggage claim area, where it must then further be handled by the individual traveler, attempts have been made to reduce time and baggage handling costs by picking up luggage destined for one or a few specific hotels directly from the incoming aircraft. This is normally carried out by dispatching a truck to the aircraft, where the baggage destined for a single or selected hotels is placed in the truck, which then travels directly to the destination at which the baggage or luggage is discharged. Obviously, such a process avoids some handling, and is especially convenient for the traveler, who is able to avoid airport baggage claim areas, with the concomitant time delays, inconveniences, tipping, luggage theft, and mixup between bags of individual travelers.

Although the aforesaid process would seem to obviate much of the disadvantages of individual passenger inconveniences, insignificant other problems arise. For example, since the baggage carrying trucks must be driven within close proximity to the aircraft, insurance costs for those vehicles, due to the history of accidents, and even collision with aircraft, have increased dramatically. In addition, where rather large groups of travelers arrive and depart from each hotel, significant delays caused by loading and unloading the luggage from a vehicle are often experienced. Moreover, the requirement of such individual vehicles for each selected hotel greatly increases costs, because of driver and vehicle expenses. Yet, the alternative of dispatching a single truck for multiple hotels, even further increases delays of delivering the baggage from an aircraft to the traveler, with 8 hour handling times not being uncommon in some vacation areas.

SUMMARY OF THE INVENTION

It is to the elimination of the aforesaid problems that the present invention is directed. The baggage and luggage handling system of this invention comprises the use of mobile capsules, into which luggage is placed, and which capsule is then designated for a single destination, such as a hotel. The mobile capsules, once loaded, is moved into a case, mounted on a trailer bed. A trailer, such as a flatbed trailer of suitable size, has secured thereon a plurality of cases, for example, between 3 and 7, depending on size and transportability of the trailer. Within each of the cases, two or more of the mobile capsules are loaded. Each case is provided with a lift means, for example, a hoist, fork lift or elevator type, for elevating one or more of the capsules, and a ramp and cooperating conveyor means for loading the capsules from ground level into the case. Further and more detailed explanation of the apparatus, as well as its use in performing an improved and more efficient system for transporting luggage, will be better understood from the following detailed description.

DETAILED DESCRIPTION OF THE INVENTION

Figure 1:
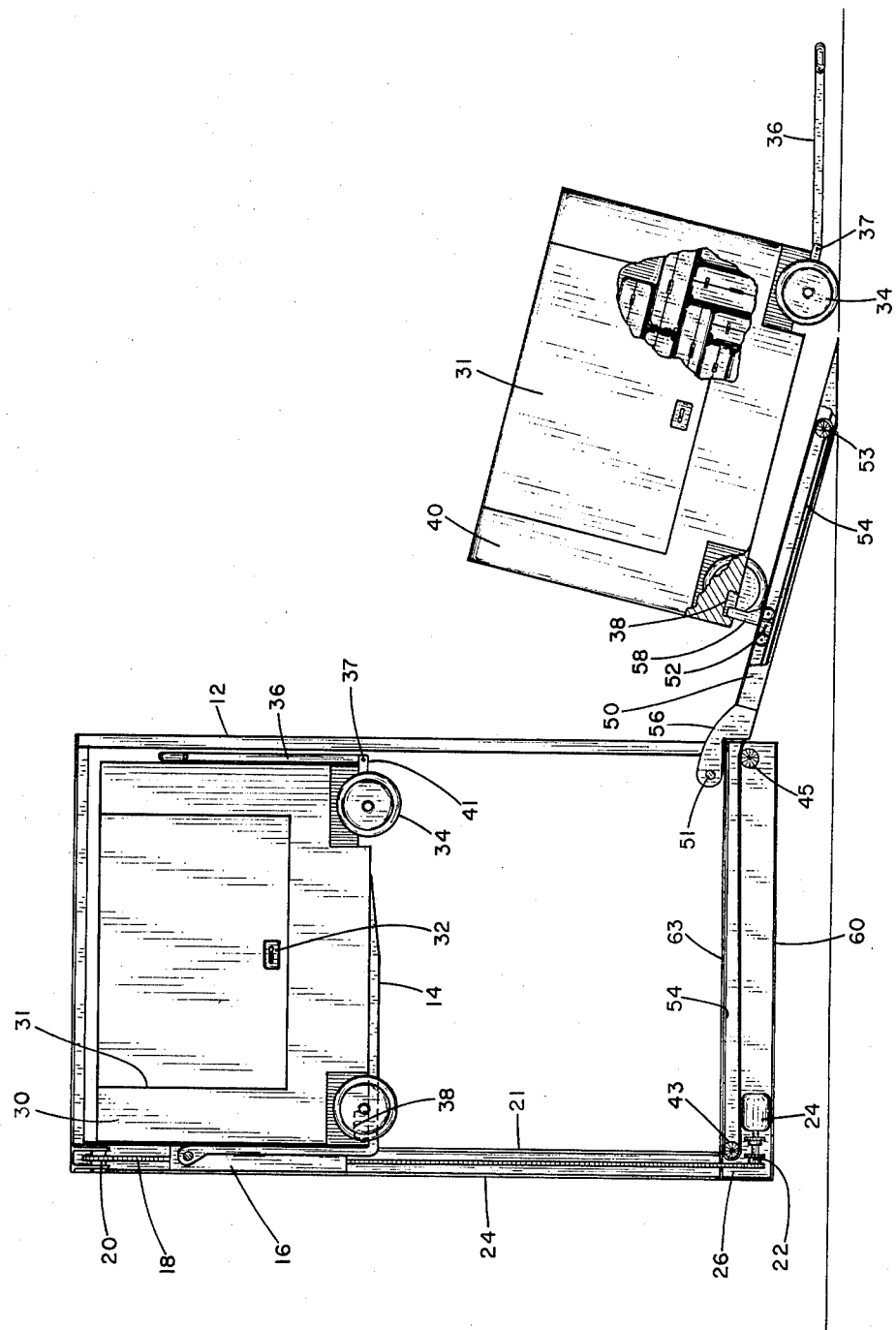
FIG. 1 is an elevational view of the invention components, partially cut away, illustrating their use in baggage and luggage handling and transportation.
Figure 2:
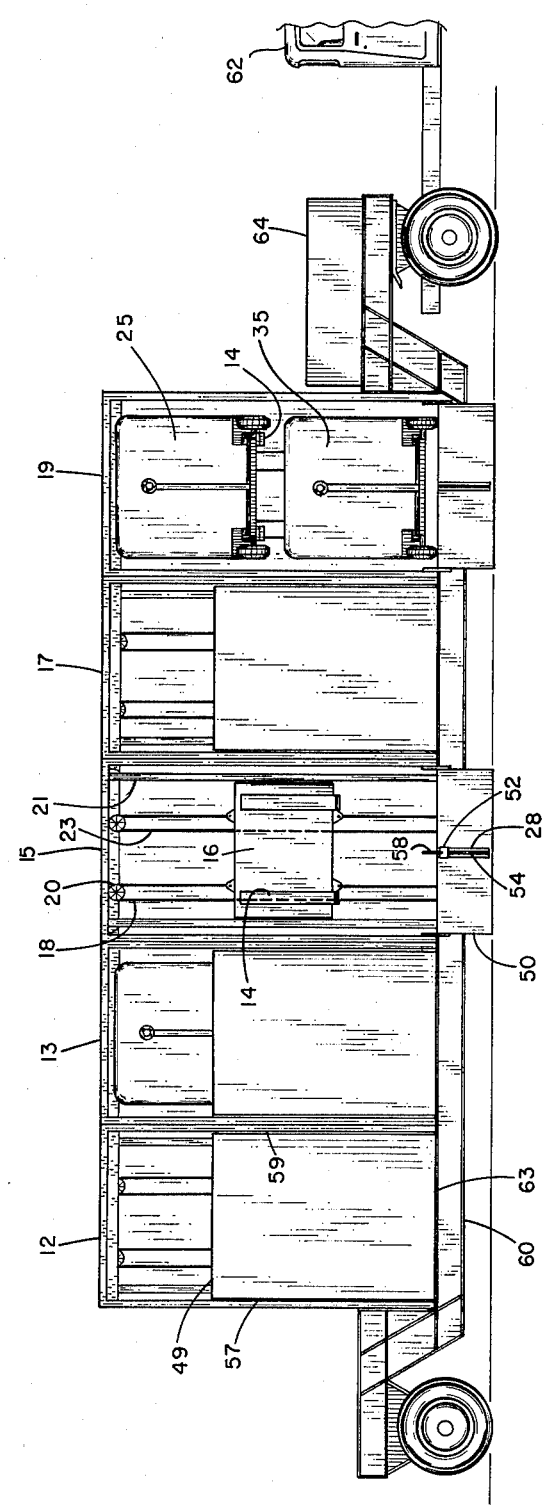
FIG. 2 is a side view showing a truck and trailer on which cases are secured and in which mobile capsules are loaded according to the invention.

The apparatus components of the improved system of the invention are illustrated in FIGS. 1 and 2, FIG. 1 showing the manner of loading mobile capsules into a case mounted or secured on a flatbed trailer. FIG. 2 shows a plurality of cases mounted on the trailer as well as illustrating another view of the ramp, conveyor and lift means associated with the cases.

In FIG. 1, the components are viewed from the back of trailer 60 on which case 12 is secured. The case may be mounted on the trailer by any suitable means, for example, bolted to trailer bed surface 63 or otherwise fastened. Since the cases are not normally removed from the trailer bed, except for repair, and because it may be desirable, if not preferred, to install drive motors for the ramp, conveyor and lift means in the trailer bed, permanent or semi-premanent mounting of the case on the trailer may be desirable. Each case provides a container in which 2 capsules are received and transported. The case may have a bottom plate, but preferably, is open at the bottom whereby tha flat trailer bed surface 63 is exposed. In addition, the top of the case may also be open, although it may be preferred to utilize a case top in order to reduce exposure of the case interior components including the mobile capsules from rain, etc.

Each case has a pair of opposite side structural members, 57 and 59 shown for case 12 in FIG. 2, and an exterior back wall 24. Preferably, interior back struts 21 are also incorporated to form a backstop for the mobile capsules as they are rolled into the case, and behind which struts, lift means components are shielded. Thus interior back struts 21 also protect forklift chain 18 or other components from contact and possible damage with a mobile capsule within the case. Any number of side and back structural members or struts may be used, or even walls or plates may be incorporated, as desired, so long as each case adequately supports the components thereof. The front of each case may be open except for ramp 50 which partially closes the front case opening, when the ramp is secured in an inoperative or storage position. For example, observing FIG. 2, the ramps in cases 12, 13, and 17 are shown in an inoperative position, and close off a substantial part of the front case opening. Such an inoperative ramp position is normally used when the trailer is being transported, or moved from place to place, as compared to the lowered or operative ramp position illustrated for cases 15 and 19, shown in FIG. 1.

The mobile capsules act as storage containers for luggage, suitcases, boxes, and the like which are handled in the process according to the invention. In Fig. 1, capsules 30 and 40 are shown, the capsule 30 being held in an elevated storage position in case 12 by lift means, while capsule 40 is being loaded into the container on the trailer 60 via ramp 50. Each capsule is substantially identical, and is provided with a lid 31, preferably conveniently accessible to an operator for loading an unloading luggage within the capsule. Any placement of the lid for such convenience may be utilized, but preferably the access opening will extend along one side of the capsule, to provide the largest opening. The lid will also be provided with a latch 32 for positively securing the lid when closed. Hinge means, or the like may be used for attaching the lid of the capsule.

Each mobile capsule is also provided with a plurality of wheels 34, four of such wheels being normally used. The front wheels cooperate with a swivel plate 41, or similar means, whereby the front wheels may be turned for guiding the capsule as it is rolled or pulled. Swivel plate 41 is attached at hinge 37 to a tongue or rod 36, the end of which tongue has means for being secured to a tractor or other vehicle for pulling the capsule. The tongue and swivel plate are hinged so that the former may be placed in a secured position as illustrated for capsule 30, once the capsule is positioned in the case for transportation. Further, each capsule may include means for securing a trailing capsule, whereby a plurality of capsules may be pulled in a train manner. Preferably, the capsule will also include means for locking the front wheels or swivel plate when the tongue has been elevated to the storage position. This will also be of assistance when the capsule is on the ground, to prevent inadvertent rolling of the capsule if it should be placed on an unlevel surface, and of course to keep the tongue out of the way when it is not being used to pull the capsule. Different tongue positions may be used for different advantages. For example, and fully elevated tongue may lock both the swivel and the brakes, whereas an intermediate position may release the braks but lock the steering or swivel plate.

The capsule loading and lift means associated with the apparatus, and particularly the case or cases and trailer, comprise ramp 50 and lift or elevating means. The purpose of the ramp is to provide a surface for extending between the trailer bed surface or case bottom, and the ground surface, and along which ramp the capsule is moved to and from the case. Thus, ramp 50 is conveniently attached to a hinge plate 56, which is hingedly or pivotally secured to a case side by hinge pin 51. Other similar or equivalent means for attaching the ramp to the case may be used, that shown being for illustration only.

In order to move each mobile capsule into a case, the system apparatus of the invention also includes a conveyor means associated with the ramp. In the specific apparatus shown, a continuous chain 54 extends between end sprockets 43 and 53, with idler sprocket 45 taking up slack in the chain. Secured to the chain is a pin assembly 52 having a pin 58 for being received in cavity 38 in a capsule. A drive motor (not shown), drives sprocket 43, whereby chain 54 is also driven thereby causing pin assembly 52 and pin 58 to move sprockets 43 and 53. The pin drive assembly, including the motor, are provided with a reversing means, such as a switch or trip lever, for reversing the chain drive when pin assembly 52 approaches sprockets 43 and 53. In order words, pin assembly 52 and pin 58 simply travel reciprocally between the two sprockets 43 and 53.

As observed in both FIGS. 1 and 2, ramp 50 is provided with a slot or channel 28 through which pin assembly 52 and pin 58 extend and along which they reciprocally travel. Although not shown, the trailer bed surface 63 also has a slot extending therealong continuous with slot 28. Each of the ramps have such a slot and the trailer bed floor has a plurality of slots, continuous with, and extending from these ramp slots or channels. Thus, as chain 54 is driven in the alternately reversing or reciprocal manner as previously described, pin assembly 52 and pin 58, attached to the chain, will be driven along the ramp and trailer floor slots, and travel therealong between the sprockets 43 and 53. When the pin assembly and pin are located nearest sprocket 53, the pin is positioned for engaging a mobile capsule at ground level. A capsule is moved until cavity 38 is positioned over pin 58. Once the pin has been received in the cavity, the drive motor may be energized, whereby chain 54, and concomitantly pin assembly 52 and pin 58, are driven toward sprocket 43 from sprocket 53, with the upstanding and exposed pin pulling a mobile capsule 40, up ramp 50, and into case 12. Once the capsule has been pulled completely into the case, the drive motor is stopped or turned off. A switch, which may be contacted by the capsule, or by pin assembly 52 or equivalent means may be used for stopping the motor as the capsule and pin assembly are driven fully into the case.

Once the first capsule has been pulled fully into a case, a lift means may be energized to secure that capsule as illustrated in FIG. 1. Thus, capsule 30 has been moved to ramp 50, where it is pulled into case 12 by pin assembly 52 and pin 58 engaging cavity 38, and the pin assembly driven into the case as previously described. Once the capsule is fully received into the case, lift drive motor 24 is manually or automatically energized, thereby driving sprocket 22 and lift chain 18, which chain is also connected to forklift port plate 16. Also secured to plate 16 are a pair of forks 14 (FIG. 2) over which capsule 30 is pulled. With lift drive motor 24 energized, lift chain 18 being driven by drive sprocket 22 and directed around return sprocket 20, and secured to forklift support plate 16, causes the plate to be elevated, and in turn, forks 14 lift the capsule to the position shown in FIG. 1. Once the first capsule (30) into the case has been so elevated and secured, the case is available for receiving a second capsule 40 in a manner illustrated. With both capsules properly received in a case, as shown in FIG. 2 with capsules 25 and 35 in case 19, the ramp can be elevated to cover the case opening. Once all of the cases have been loaded with the capsules, truck 62 pulls trailer 60 to the desired locations for unloading or dropping off the capsules.

When it is desired to unload a capsule from a case, the ramp is dropped until it extends fully to ground level (or other surface), as illustrated in FIG. 1. Pin 58 is then inserted or otherwise engaged into cavity 38, and the drive motor for chain 54 is energized, whereby the capsule is pushed out of the case, and down the ramp to ground level. Of course, where the capsule wheels are locked, or brakes are otherwise applied by having tongue 36 in an upright or storage position, the tongue is brought downwardly, and also used for effectively assisting in guiding the capsule down the ramp. Once the capsule has been brought fully to ground level, pin 58 is removed from cavity 38, and the drive motor reversed for directing the pin assembly and pin back to the case near sprocket 43. At that time, case 30, which has been maintained in an elevated position, is brought down by energizing lift motor 24, whereupon forklift plate 16 and forklift 14 are driven downwardly until the capsule rests on the case or trailer floor. That capsule may then be removed from the case at any desired location according to the sequence previously described.

Figure 3:
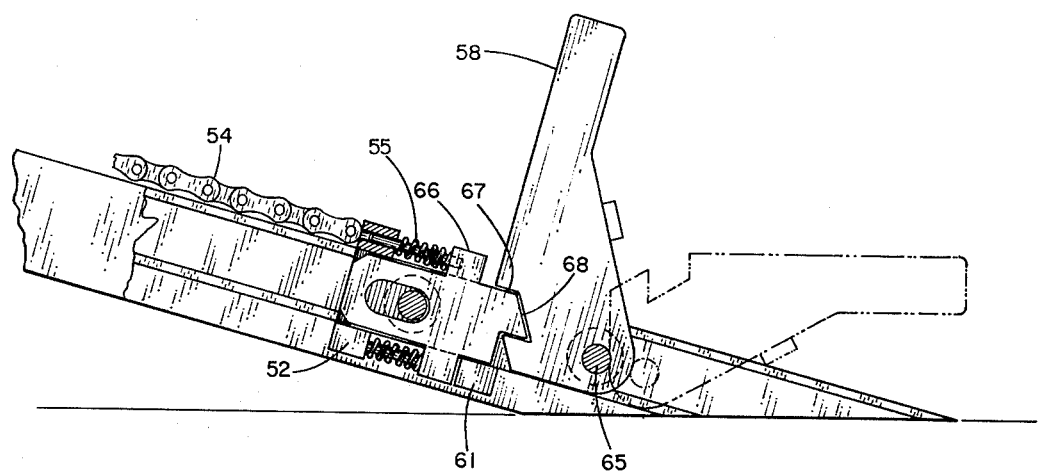
FIG. 3 is a fragmentary and enlarged view showing a hinged pin embodiment.

It may be desirable to incorporate a means on the pin assembly for easily withdrawing or inserting it into the capsule cavity. A hinge, swivel, pivot or other means associated with the pin assembly or pin may be used whereby the pin can be lowered, or angled, thereby removing it from or inserting it in the cavity at the time the capsule is being loaded or unloaded. One such means is shown in FIG. 3, in which tow pin 58 is pivotally mounted on pin assembly 52 at pin 65. A notch 68 is formed on pin 58, into which latch 67 normally is forced to hold the pin in an upright position for being received in a capsule engaging cavity previously discussed. Latch 67 projects from lock body 66, which is biased towards the pin by spring 55. A slide means allows the lock body to move reciprocally with respect to pin assembly 52. In operation, the pin and pin assembly are driven by the chain down the ramp toward a sprocket until lock body 66 engages trip bar 61, near the end of the lowered ramp (see FIG. 1). Upon contact with the trip bar, the lock body is driven back against the bias of spring 55, until latch 57 is forced out of notch 68. As this occurs, pin 58 is released and is pivoted on pin 65 to a position shown in phantom, thereby being disengaged from the capsule. Such a feature will be advantageous for engaging and disengaging the pin with capsules at the lowered ramp end. However, within a case the pin need not be pivoted normally, because the capsule is simply lifted off of or lowered onto the pin by the lift means described hereinabove.

The procedure for transporting the baggage utilizing the apparatus of the invention in the manner described will achieve the desired result of conveniently handling and transporting a relatively large number of luggage pieces, and yet requiring only one truck and trailer. Where the apparatus is used for transporting baggage from an air terminal to a specific number of hotels, it may be preferred to designate one capsule for each of the hotels to be served. Commonly, in group travel, the luggage will be marked for destination to a specific hotel when it is handled or checked in by the baggage handling personnel at the point of travel origin. To load the different capsules, truck 62 and trailer 60 may be driven to the airport vicinity, and the empty capsules removed from the respective cases and pulled to the aircraft. The luggage is loaded into the capsules, each destined for a specific hotel or other location. Thereafter, the capsules are closed and pulled to the ramps where they are then loaded into the cases as previously described.

Once the capsules have been loaded into the cases, the truck and trailer are then driven to the different locations, where the capsules destined for a specific hotel are removed. the capsules may be conveniently held at the hotel until luggage is to be transported therefrom back to the air terminal. The baggage transportation process will then simply be reversed, with the truck, trailer and secured cases being sequentially driven to the hotels, where the capsules will be loaded, and on to the airport for again removing the capsules from the cases, and the baggage from the capsules for loading into the aircraft.

Although the apparatus shown herein uses 5 cases on the trailer bed, the number is not critical, and may be modified to suit the desired use. Of course, the number of cases may also be varied depending on the trailer size as well as capsule size and capacities. Thus, any trailer, case size, capsule size, and the like, may be modified to suit the desired use preferences at any given area or location. Moreover, the number of capsules held in any case is preferably two, whereby only one capsule needed be elevated, with multiple capsule elevation requiring additional equipment, within the purview of the apparatus disclosed herein. Cases may be made whereby capsules may also be stored side by side in any single case, in which event, the wall or side support structure of the individual cases disclosed herein will be modified. Other apparatus features including dirve motors, chains, sprockets, and the like may be modified to achieve the desired purpose. Further, instead of electric motor and chain drives for the conveyor and lift features, hydraulic or other suitable drive means may be used. Power pack storage container 64 is an example of how the trailer may also be modified for power equipment to drive the various motors, etc. These as well as other equivalent modifications of the apparatus and its use within the purview of the invention described herein will be evident to those skilled in the art. Although the invention has been discussed in terms of baggage handling, it will be understood that it is not to be so limited and may be used for transporting any items or devices.

I claim:

1. A method of transporting baggage from a first location to a plurality of remote locations utilizing apparatus having a plurality of cases secured on a trailer, each case having lift means for elevating a capsule placed therein, comprising the steps:
   (a) placing the baggage in selected ones of a plurality of mobile capsules,
   (b) moving a first one of said selected mobile capsules into a first one of said cases,
   (c) energizing the lift means for said first case whereby said first one of said mobile capsules is elevated within said first case by said lift means and supported thereby,
   (d) moving a second one of said selected mobile capsules into said first case,
   (e) repeating steps (b) - (d) for loading different selected ones of said plurality of mobile capsules in one or more of said other cases until the desired number of cases have been loaded with said mobile capsules, and
   (f) moving said trailer successively to said plurality of remote locations, and removing one or more of said mobile capsules from a case at each successive location.

2. The method of claim 1 wherein each of said cases includes a ramp and a conveyor means cooperating therewith for engaging a capsule at ground level, and wherein step (b) includes moving each of said mobile capsules to said ramp, engaging said mobile capsules with said conveyor means, and moving said capsules along said ramp and into the respective cases.

* * * * *